US008162210B2

(12) United States Patent
McInerney et al.

(10) Patent No.: US 8,162,210 B2
(45) Date of Patent: Apr. 24, 2012

(54) WATER AND DRINK MIX VENDING MACHINE

(75) Inventors: Brian McInerney, Carlsbad, CA (US); Justin Pigott, Laguna Niguel, CA (US)

(73) Assignee: Glacier Water Services, Inc., Vista, CA (US)

( * ) Notice: Subject to any disclaimer, the term of this patent is extended or adjusted under 35 U.S.C. 154(b) by 684 days.

(21) Appl. No.: 12/192,788

(22) Filed: Aug. 15, 2008

(65) Prior Publication Data

US 2009/0045256 A1 Feb. 19, 2009

Related U.S. Application Data

(60) Provisional application No. 60/956,341, filed on Aug. 16, 2007.

(51) Int. Cl.

| | |
|---|---|
| ***G06F 17/00*** | (2006.01) |
| ***G06F 7/00*** | (2006.01) |
| ***G06K 15/00*** | (2006.01) |
| ***G06F 7/08*** | (2006.01) |
| ***A47F 1/00*** | (2006.01) |
| ***B67B 7/00*** | (2006.01) |
| ***G01F 11/00*** | (2006.01) |

(52) U.S. Cl. ........ 235/381; 235/375; 235/376; 235/378; 221/96; 222/1; 705/413

(58) Field of Classification Search .................... 221/96; 235/375, 376, 378, 381; 705/16, 400, 413; 222/1, 475.1

See application file for complete search history.

(56) References Cited

U.S. PATENT DOCUMENTS

| | | | | |
|---|---|---|---|---|
| 3,578,126 | A * | 5/1971 | Adams | 194/202 |
| 3,822,810 | A * | 7/1974 | Fuqua | 222/146.5 |
| 3,856,676 | A * | 12/1974 | Grimme et al. | 210/96.1 |
| 4,133,421 | A * | 1/1979 | Hanley et al. | 194/257 |
| 4,815,633 | A * | 3/1989 | Kondo et al. | 222/129.4 |
| 5,000,082 | A * | 3/1991 | Lassota | 99/304 |
| 5,116,632 | A * | 5/1992 | Miller | 426/597 |
| 5,121,855 | A * | 6/1992 | Credle, Jr. | 222/129.2 |
| 5,918,768 | A * | 7/1999 | Ford | 222/113 |
| 6,197,189 | B1 * | 3/2001 | Schwartz et al. | 210/192 |
| 6,505,758 | B2 * | 1/2003 | Black et al. | 222/146.6 |
| 6,675,985 | B2 * | 1/2004 | Sato et al. | 221/96 |
| 6,837,397 | B2 * | 1/2005 | Lassota | 222/129.3 |
| 6,935,532 | B2 * | 8/2005 | Tinucci et al. | 222/129.4 |
| 7,231,279 | B2 * | 6/2007 | Ghidotti | 700/239 |
| 7,806,294 | B2 * | 10/2010 | Gatipon et al. | 222/1 |
| 2002/0161653 | A1 * | 10/2002 | Walker et al. | 705/22 |
| 2003/0015546 | A1 * | 1/2003 | Stettes et al. | 222/1 |
| 2003/0071061 | A1 * | 4/2003 | Lassota | 222/129.3 |
| 2005/0029287 | A1 * | 2/2005 | Mobbs | 222/1 |
| 2005/0038559 | A1 * | 2/2005 | Ghidotti | 700/239 |
| 2005/0082308 | A1 * | 4/2005 | Simson | 221/105 |
| 2005/0127098 | A1 * | 6/2005 | Bertone | 222/129.1 |
| 2006/0071015 | A1 * | 4/2006 | Jablonski et al. | 222/1 |
| 2007/0000949 | A1 * | 1/2007 | Bosi | 222/312 |
| 2007/0095901 | A1 * | 5/2007 | Illingworth | 235/381 |

(Continued)

*Primary Examiner* — Daniel Walsh

(74) *Attorney, Agent, or Firm* — Knobbe Martens Olson & Bear, LLP

(57) ABSTRACT

A liquid and drink mix vending machine can vend both potable water and as an additional purchase option drink mixes (e.g., flavored drink mixes). The vending machine can include a liquid vending system and a drink mix vending system. The liquid vending system can vend different amounts of water, which can be delivered to a container provided by a user. The drink mix vending system can vend a variety of drink mixes, including drink mixes of different concentrations for a given quantity of water.

26 Claims, 4 Drawing Sheets

U.S. PATENT DOCUMENTS

| | | | | |
|---|---|---|---|---|
| 2007/0114244 | A1* | 5/2007 | Gatipon et al. | 222/129.1 |
| 2007/0131762 | A1* | 6/2007 | Dumont | 235/381 |
| 2008/0020115 | A1* | 1/2008 | Guerrero et al. | 426/533 |
| 2008/0054015 | A1* | 3/2008 | Moezidis | 222/1 |
| 2008/0163756 | A1* | 7/2008 | Stettes | 99/280 |
| 2008/0164274 | A1* | 7/2008 | Stettes | 221/5 |
| 2009/0183779 | A1* | 7/2009 | Minard et al. | 137/14 |
| 2009/0250490 | A1* | 10/2009 | Straza | 222/132 |
| 2010/0116842 | A1* | 5/2010 | Hecht et al. | 222/1 |
| 2010/0116844 | A1* | 5/2010 | Bissinger | 222/1 |
| 2010/0294797 | A1* | 11/2010 | Hirschbain | 222/1 |

* cited by examiner

WATER AND DRINK MIX VENDING MACHINE

CROSS-REFERENCE TO RELATED APPLICATIONS

This application claims the benefit of priority under 35 U.S.C. §119(e) of U.S. Provisional Application No. 60/956,341, filed on Aug. 16, 2007, the entire contents of which are incorporated by reference herein and should be considered a part of this specification.

BACKGROUND OF THE INVENTION

1. Field of the Invention

The present invention relates to a vending machine, and more particularly to a vending machine that vends both drinking water and drink mixes (e.g., flavored drink mixes).

2. Description of the Related Art

Proper hydration is important to maintain health. Consumers have several options for maintaining proper hydration, the most common of which is water.

As an alternative to municipal water supplies, consumers purchase bottled water, but bottled water can be expensive and generate waste (e.g., empty bottles) that are not always recycled. Users can also purchase water from dispensing machines, which is generally less expensive than bottled water, provides water of comparable quality and avoids the generation of waste associated with bottled water. Additionally, water dispensing machines are conveniently found near supermarkets, mini-markets and other locations, making them easily accessible to the public.

However, a need exists for a water vending machine that provides consumers options for customizing the water purchased at the vending machine.

SUMMARY OF THE INVENTION

In view of the circumstances noted above, an aspect of at least one of the embodiments disclosed herein is to provide a vending machine that can dispense potable water and optionally dispense at least one drink mix.

In accordance with one embodiment, a water and drink mix vending machine is provided. The vending machine comprises a vending machine body with at least one opening configured to receive a container for the delivery of water into the container. The water and drink mix vending machine also comprises a first actuator actuatable to select the dispensing of water from the vending machine body, a second actuator actuatable to select the dispensing of a drink mix from the vending machine body, and a payment interface configured to receive payment for the water and drink mix. A dispensing mechanism is configured to dispense the water upon receipt of payment for the water and to dispense the drink mix upon receipt of payment for the drink mix. The dispensing mechanism is further configured to dispense the drink mix separately from the water, wherein the drink mix is in an unmixed state relative to the water.

In accordance with another embodiment, a water and drink mix vending machine is provided. The vending machine comprises a vending machine body with at least one opening configured to receive a container for delivery of water into the container. The water and drink mix vending machine also comprises a user interface configured to receive instructions from a user to dispense water and a drink mix, and a processor configured to receive a signal corresponding to said user instructions and to associate said signal with a corresponding actuation command. The processor is further configured to output said actuation command upon receipt of a signal confirming payment of a designated purchase price for the water and drink mix. A dispenser is configured to receive said actuation command from the processor and to dispense the water and drink mix, wherein the drink mix is in an unmixed state relative to the water.

In accordance with yet another embodiment, a method for dispensing water and a drink mix from a vending machine is provided. The method comprises receiving payment of a designated purchase price corresponding to a quantity of water and drink mix, receiving a request from a user for the vending of said water and drink mix from a vending machine, communicating a liquid dispensing actuation signal to a liquid dispensing system for dispensing said water into a container removably disposed in the vending machine, and communicating a drink mix dispensing actuation signal to a drink mix dispensing system for dispensing said drink mix to the user via a drink mix holder, wherein the drink mix holder is separate from the container.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 4 figures.

DETAILED DESCRIPTION OF THE PREFERRED EMBODIMENTS

Figure 1:
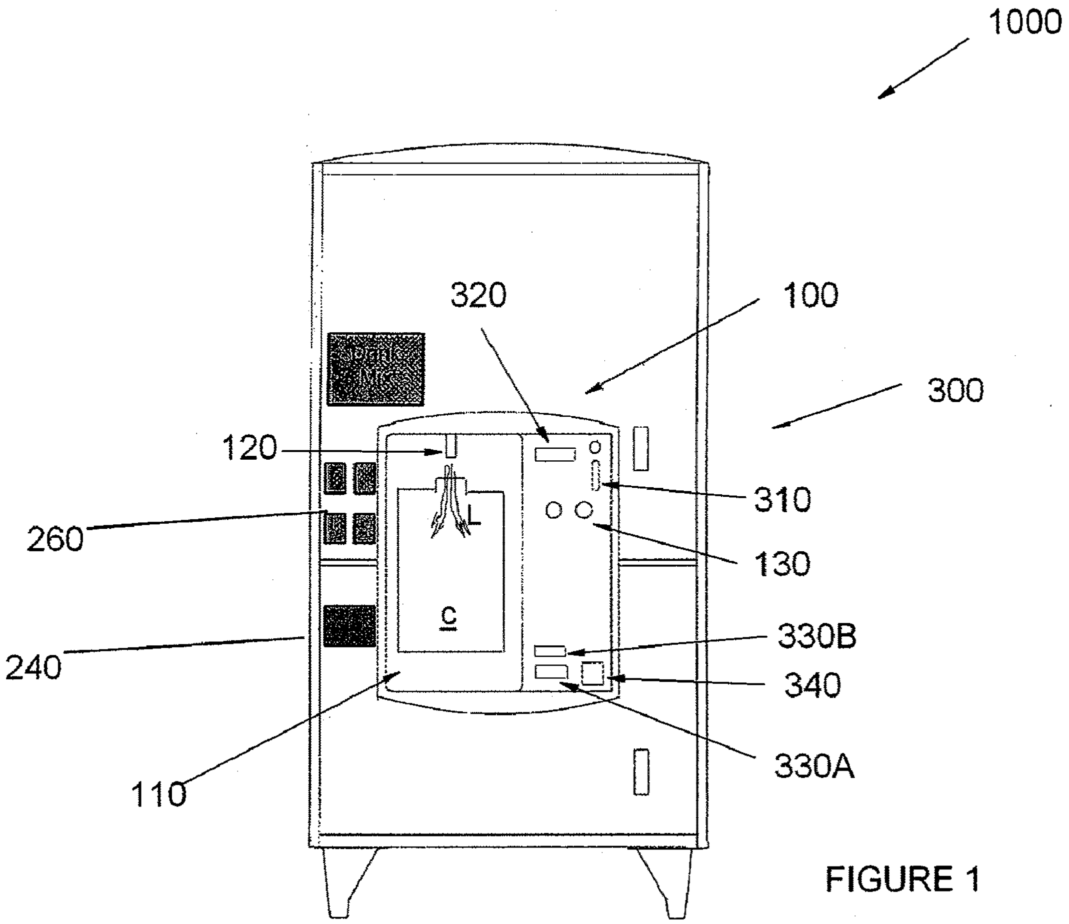
FIG. 1 is a schematic front view of one embodiment of a water and drink mix vending machine.
Figure 2:
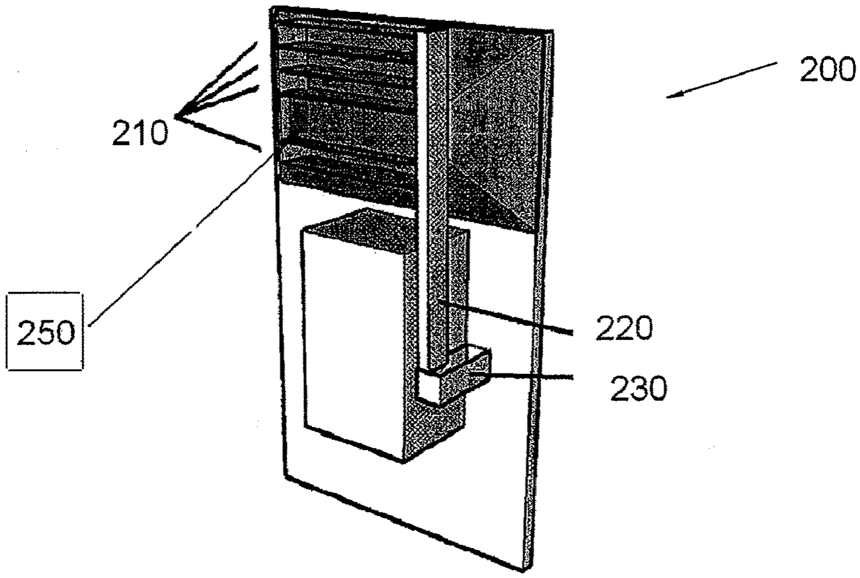
FIG. 2 is a schematic perspective rear view of a drink mix dispensing system associated with the water vending machine of FIG. 1.

FIGS. 1-3B show one embodiment of a liquid and drink mix vending machine 1000 (hereafter "LDM machine"). In one embodiment, the LDM machine 1000 can vend, as the liquid L, water. However, in other embodiments, the LDM machine 1000 can vend other potable liquids. The LDM machine can also vend at least one drink mix DM, as further described below.

The LDM machine 1000 can have potable liquid vending system 100 that can vend a selected amount of potable liquid. In the illustrated embodiment, the potable liquid vending system 100 can vend water L.

The liquid vending system 100 can include a dispensing area 110 sized to receive a container C (e.g., an empty reusable container provided by the user) to received the water L provided by the LDM machine 1000. Optionally, the vending system 100 can itself store one or more containers and dispense the container into the dispensing area so that the user need not supply the container. In one embodiment, the LDM machine 1000 can dispense the container C before the container C is filled. In another embodiment, the LDM machine 1000 can dispense the container C after it has been filled with water L and sealed. By way of example, a container can include a screwed on top, a snap on top, a flip-open top, and/or a "sports" top. The container can be insulated or uninsulated.

In one embodiment, the dispensing area 110 can be a recess sized to receive containers of a variety of volumes (e.g., 1 gallon, 5 gallons, ½ litter, etc.). The liquid vending system 100 can also include a discharge nozzle 120, for example at an upper portion of the dispensing area 100, via which the water L is delivered. The user can thus align the opening of the container C with the discharge nozzle 120 to direct the water L vended by the LDM machine 1000 into the container C.

The discharge nozzle 120 can be connected to a water supply (not shown), such as, for example, a municipal water supply. In a preferred embodiment, the discharge nozzle 120 is connected to the water supply via at least one filter and/or treatment device (not shown) that can filter out undesirable materials from the supply water or treat the supply water. For example, the at least one filter/treatment device can filter out chlorine, dirt, rust, salts, lead, or other particles and impurities. The filter/treatment device can also use ozone or UV to treat the supply water, remove odors from it and improve its taste. In another embodiment, the discharge nozzle 120 is optionally connected to a filter and/or treatment device.

The liquid vending system 100 can also include at least one liquid selection device 130 that can be used by a user to select a desired amount of water L. In one embodiment, the at least one liquid selection device 130 can be a plurality of buttons, each button actuatable to select a predetermined amount of water L (e.g., ½ liter, 1 liter, 1 gallon, 5 gallons) associated with said button. In the illustrated embodiment, two buttons are shown, though one of ordinary skill in the art will recognize that the liquid selection device 130 can include fewer or more buttons than in the illustrated embodiment. The liquid selection device 130 can have other suitable configurations, such as a keyboard interface via which the user can enter a desired amount of water L. If the system 100 is also dispensing the receiving container, optionally the user can select the size (e.g., ½ liter, 1 liter, 1 gallon, 5 gallons), and the selected container will be dispensed, and corresponding amount of water L will be automatically selected by the system 100.

In one embodiment, a drink mix vending system 200 can be built into the LDM machine 1000. In another embodiment, the drink mix vending system 200 can be a separate system attached to the LDM machine 1000.

The drink mix vending system 200 can include at least one product tray or support 210 that can releasably retain at least one drink mix container 250. In the illustrated embodiment, the drink mix vending system 200 has a plurality of product trays 210. The product tray 210 can be attached to a drop chute 220 via which the drink mix container 250 can be dispensed, as discussed further below. In one embodiment, a product delivery bin 230 can be coupled to the drop chute 200 and be sized to allow a user to access the drink mix container in the delivery bin 230. The product delivery bin 230 can communicate with a drink mix retrieval opening 240 in the LDM machine 1000, via which the user can access the delivery bin 230. An actuator (not shown) associated with the at least one product tray 210 can be actuated, as further described below, to dispense the drink mix 250 from the product tray 210 and into the product delivery bin 230 via the drop chute 220. In one embodiment, the actuator can be a screw actuator driven, for example, by a motor that can be actuated to rotate to advance the drink mix container 250 in contact with the screw actuator toward the drop chute 220. However, the actuator can have other suitable configurations.

The drink mix vending system 200 can also include at least one mix selection device 260 that can be used by a user to select a desired drink mix 250. In one embodiment, the at least one mix selection device 260 can include a plurality of buttons, each button actuatable to select a predetermined drink mix 250 associated with said button. In the illustrated embodiment, four buttons are shown, though one of ordinary skill in the art will recognize that the mix selection device 260 can include fewer or more buttons than in the illustrated embodiment. The mix selection device 260 can have other suitable configurations.

With continued reference to FIG. 1, a payment interface 300 can be built into the LDM machine 1000 or be a separate component that communicates with the LDM machine 1000 and can in one embodiment be attached to the LDM machine 1000. The payment interface 300 can include a coin slot 310 that can receive coins, a visual display 320 (e.g., for displaying the amount of payment), bill slot 330A for receiving paper currency, and/or a slot 330B for receiving debit cards, credit cards, prepaid cards, smart cards, etc. The payment interface 300 can also include a change retrieval area 340 via which the user can retrieve change from the purchase of water L and/or drink mix 250. In one embodiment, the LDM machine 1000 can receive payment for the purchase of water L and/or drink mix 250 electronically via a wired connection. In another embodiment, the LDM machine 1000 can receive payment for the purchase of water L and/or drink mix 250 via a wireless connection from a remote location (e.g., via a wireless phone or other voice and/or data communication device).

In one embodiment, the price of the water L and drink mixes 250 can be separate. In another embodiment, the price of the water L and drink mixes 250 can be bundled. Additionally, the pricing for the drink mix 250 can vary with the concentration of the mix 250 relative to the water L purchased. For example, a user can purchase a drink mix 250 with a concentration corresponding to the quantity of water L purchased from the LDM machine 1000 for a given price, as well as purchase drink mix 250 with a higher concentration than that corresponding to the quantity of water L purchased for an increased price.

Various packaging configurations can be used for the drink mix 250. For example, the drink mix container 250 can be at least one of a canister, a bag, a stick, a pouch, or other suitable packaging configuration. In one embodiment the drink mix container 250 is resealable (e.g., using a pressure sensitive adhesive on a flap or interior surface, using a tie-wrap, or a zip lock-type of arrangement). Additionally, the drink mix 250 can include a plurality of containers with different flavor mixes, and may be in different forms, such as dry mixes, gels, tablets and liquid concentrates. The drink mix 250 can have numerous flavor combinations, including isotonic sport mixes, lemonades, iced teas, vitamin enhanced mixes, fruit drinks, etc. In another embodiment, the drink mix 250 can include soup mixes, chocolate mixes, coffee mixes, tea mixes, and the like. In one embodiment, the drink mix 250 can be automatically dispensed (or via a manual selection) in a variety of concentrations to match with varying quantities of water, such as the quantities of water L purchased from LDM machine 1000. For example, the drink mix 250 can come in 1 gallon mixes, 5 gallon mixes, ½ liter mixes, etc.

Figure 3A:
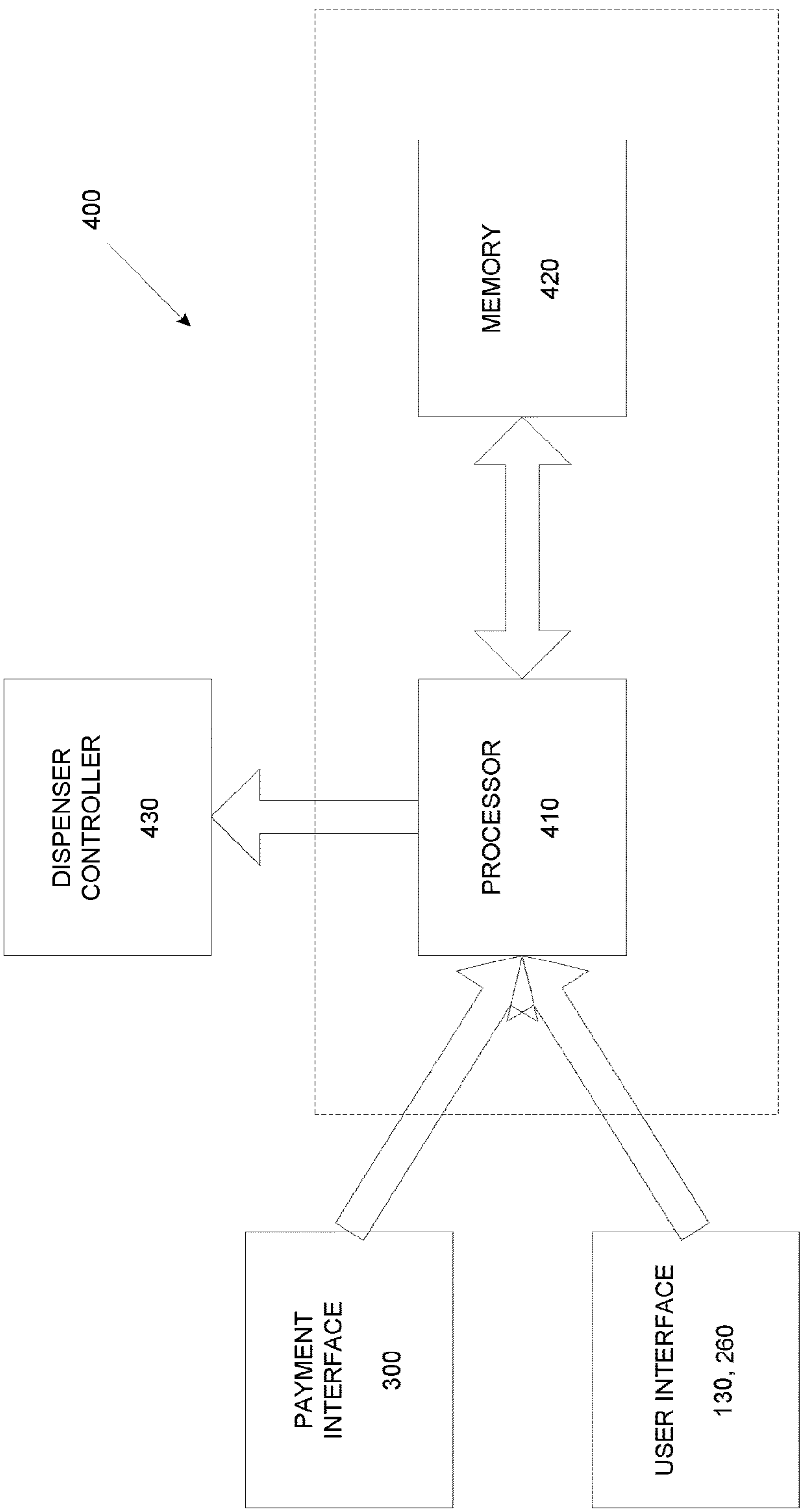
FIG. 3A is a block diagram of a control system for the water and drink mix vending machine.

FIG. 3A shows one embodiment of a controller 400 for use with the LDM machine 1000. The controller 400 can include a processor 410 that can communicate with a memory 420. The processor 410 can receive signals from the liquid selection device 130 and mix selection device 260, and can communicate with the memory 420 to associate said signals with corresponding water L or drink mix 250 quantities. The processor 410 can communicate an output signal to a dispenser controller or actuator 430 associated with the discharge nozzle 120 or product tray 210, upon receipt of a signal from the payment interface 300 confirming receipt of payment for the requested quantity of water L and/or drink mix 250, to dispense the quantity of water L and/or drink mix 250 corresponding to the output signal. For example, the actuator can be a motor that drives a pump for pumping supply water through the liquid dispensing system 100. In another embodiment, the actuator can be a bladder tank and solenoid valve that selectively allows flow of supply water L through the liquid dispensing system 100. A flow meter (not shown) can be used to dispense the requested quantity of water L.

The memory 420 can include a random access memory (RAM) or other dynamic storage device for storing information and instructions to be executed by the processor 410, such as the method 500 of FIG. 4, described further below. The memory 420 can also be used for storing temporary variables or other intermediate information during execution of instructions to be executed by the processor 410. For example, the memory 420 can include pricing data for different quantities of water L and/or different drink mixes 250 (e.g., different concentrations of drink mix, or different flavors of drink mix). The memory 420 can further include a read only memory (ROM) or other static storage device for storing static information and instructions provided to the processor 410.

Figure 3B:
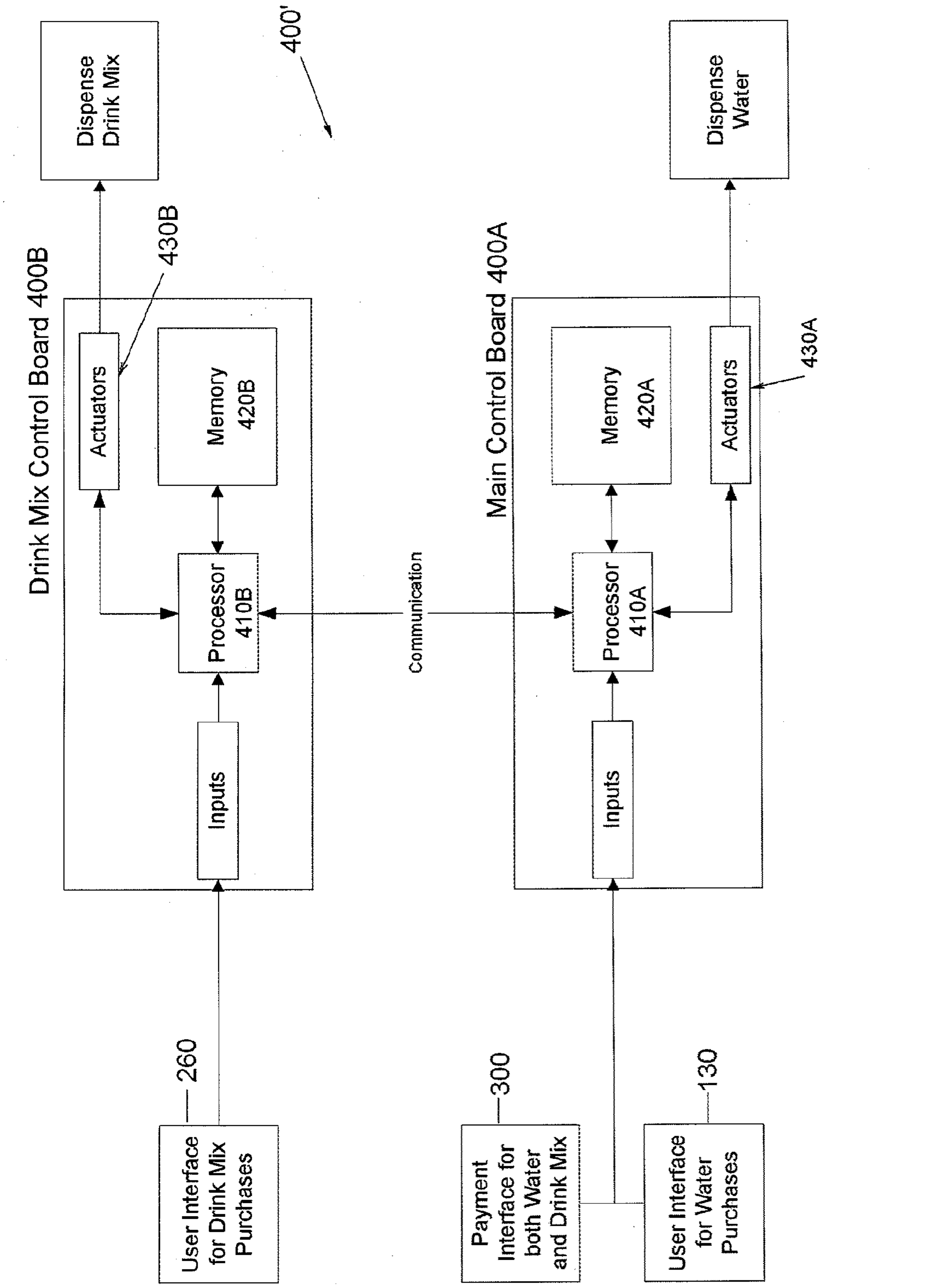
FIG. 3B is a block diagram of another embodiment of a control system for the water and drink mix vending machine.

FIG. 3B shows another embodiment of a controller 400' for use with the LDM machine 1000. The controller 400' can include a main control board 400A and a drink mix control board 400B.

The main control board 400A can include a processor 410A in communication with a memory 420A and an actuator 430A. The processor 410A can receive signals via an input module from the liquid selection device 130 and payment interface 300, and can communicate with the memory 420A to associate said signals with a corresponding water L quantity. The processor 410A can communicate an output signal to the controller 430A associated with the discharge nozzle 120 to dispense the quantity of water L corresponding to the output signal.

The drink mix control board 400B can include a processor 410B in communication with a memory 420B and an actuator 430B. The processor 410B can receive signals via an input module from the drink mix selection device 260 and payment interface 300 (e.g., via communication with the processor 410A), and can communicate with the memory 420B to associate said signals with a corresponding drink mix 250. The processor 410B can communicate an output signal to the controller 430B associated with the product tray 210 to dispense the drink mix 250 corresponding to the output signal. The processors 410A, 410B can preferably communicate with each other. In one embodiment, the processors 410A, 410B can communicate via a wired connection. In another embodiment, the processors 410A, 410B can communicate via a wireless connection (e.g., RF communication).

In one embodiment, the LDM machine 1000 can also compensate for temperature and dispense water L at ambient, heated or cooled temperatures. For example, the LDM machine 1000 can have a heating system (not shown) for heating the supply water and dispensing the heated water L, as requested by the user. An operator and/or user control is optionally provided for setting the temperature (e.g., one or more switches, buttons, or other user interfaces). The LDM machine 1000 can also have a cooling system (not shown) for cooling the supply water and dispensing the cooled water L, as requested by the user. The cooling and heating functions of the heating system and cooling system, respectively, can in one embodiment be controlled by the processor 410.

Figure 4:
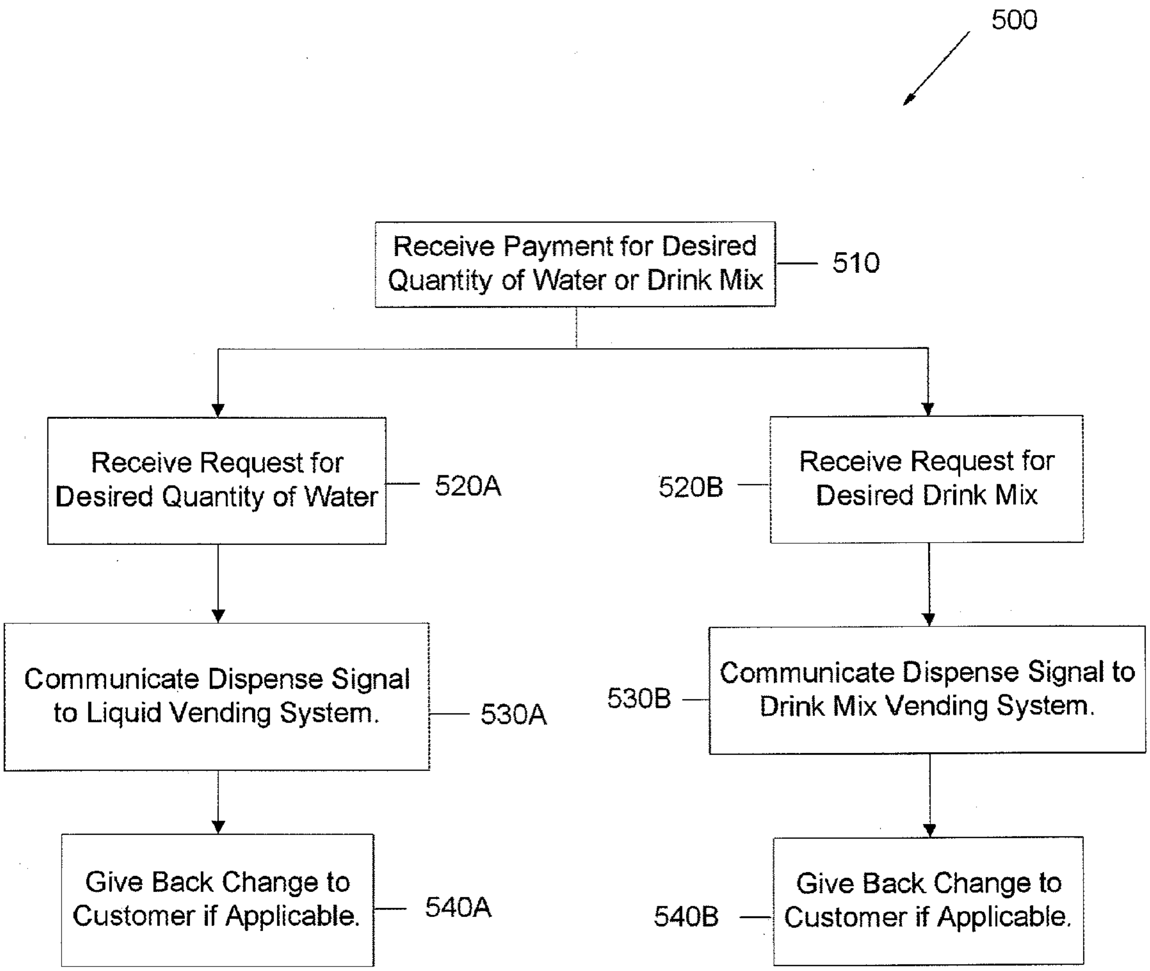
FIG. 4 is a block diagram of a method for operating a water and drink mix vending machine.

With reference to FIG. 4, a method 500 for dispensing liquid and/or drink mix 250 from the LDM machine 1000 is provided. The method can include receiving payment 510 (e.g., via the payment interface 300) for a desired quantity of water L and/or drink mix 250. The method also can include receiving a request 520A from a user for a desired amount of water L and/or a request 520B for a desired drink mix 250. For example, the user can press a button of the liquid selection device 130 associated with a ½ liter, 1 gallon, 5 gallons, etc and/or a button of the drink mix selection device 260 associated with a particular drink mix 250. A liquid dispensing actuation signal can be communicated 530A to the liquid vending system 100 to dispense the requested amount of water L via, for example, the discharge nozzle 120. Similarly, a drink mix dispensing actuation signal can be communicated 530B to the drink mix vending system 200 to dispense the desired drink mix 250 via, for example, the product tray 210 and drop chute 220. The method can also include returning 540A, 540B change back to the customer for the purchase of the water L and/or drink mix 250.

In one embodiment, the desired quantity of water L and drink mix 250 can be purchased together (e.g. payment for the desired quantity of water L and drink mix 250 can be received at the same time). In another embodiment, the desired quantity of water L can be purchased separately. The quantity of water L and drink mix 250 are optionally separately provided to the user and in an unmixed state. The user can then mix the drink mix 250 with the purchased water L to prepare the flavored water. The user can elect to drink all or a portion of the water without the drink mix flavoring, or optionally can manually open the flavor mix container and add flavoring as desired to all or a portion of the purchased water L. The LDM machine 1000 can advantageously give consumers the option of purchasing a liquid, such as water L, in a desired amount along with a drink mix 250 for flavoring said water L. Accordingly, consumers can vary the flavor of vended water as desired.

In one embodiment, the water L and drink mix 250 can be purchased via a single payment system. In another embodiment, the water L and drink mix 250 can be purchased via separate payment systems. In another embodiment, the drink mix 250 can be dispensed for free upon the purchase of a quantity of water L. In another embodiment, the purchase price of the drink mix 250 can be reduced (e.g., discounted) with the purchase of water L.

In one embodiment, the LDM machine 1000 provides the drink mix 250 in concentrations that matches the quantity of water L sold. In another embodiment, the LDM machine 1000 can provide drink mix 250 in fixed concentrations that may or may not match all the possible quantities of water dispensed by the LDM machine 1000.

Of course, the foregoing description is that of certain features, aspects and advantages of the present invention, to which various changes and modifications can be made without departing from the spirit and scope of the present invention. Moreover, the vending systems and methods need not feature all of the objects, advantages, features and aspects discussed above. Thus, for example, those of ordinary skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed vending systems and methods.

What is claimed is:

1. A water and drink mix vending machine, comprising:

a vending machine body with at least one opening configured to receive a container from a user for the delivery of water into the container;

a first actuator actuatable to select the dispensing of an amount of water from the vending machine body, wherein the amount is selected from a plurality of user selectable amounts;

a second actuator actuatable by a user to select the dispensing of a user selected drink mix package selected from a plurality of individual sealed drink mix packages of a plurality of user selectable predetermined concentrations from the vending machine body, each of the plurality of user selectable predetermined concentrations corresponding to different amounts of water;

a payment interface configured to receive payment for the water and drink mix;

a liquid dispensing mechanism comprising a discharge nozzle that is fluidly connectable to a municipal water supply via one or more filters that filter out undesirable particles or impurities from the water, the discharge nozzle being alignable with the container and configured to dispense the water into the container positioned in the opening upon receipt of payment for the water; and a drink mix dispensing mechanism comprising one or more product trays configured to support the plurality of individually sealed drink mix packages, each of the plurality of individually sealed drink mix packages containing a drink mix in a predetermined amount, a drop chute extending from a proximal end to a distal end, the proximal end of the chute in communication with the product tray and sized to allow the user selected drink mix package to pass therethrough, and a delivery bin that is attached to the distal end of the drop chute, the delivery bin sized to receive the user selected drink mix package and to allow the user to retrieve the user selected drink mix package, the delivery bin being separate from the opening that receives the container, wherein the drink mix dispensing mechanism is configured to dispense the user selected drink mix package separately from the water upon receipt of payment for the user selected drink mix package, wherein the drink mix is dispensed in an unmixed state relative to the water, and wherein the user selected drink mix package has a concentration that corresponds to at least an amount of water equal to the user selected amount of water, the drink mix package being automatically dispensed upon selection by the user.

2. The vending machine of claim 1, wherein the first actuator is actuatable to select the dispensing of a user specified amount of water.

3. The vending machine of claim 1, wherein the first and second actuators comprise push buttons.

4. The vending machine of claim 1, wherein the payment interface receives payment of a designated purchase price for the water and/or drink mix via coin, paper currency, debit card, credit card, and/or prepaid card.

5. The vending machine of claim 1, wherein the payment interface is built into the vending machine body.

6. The vending machine of claim 1, wherein the payment interface is configured to receive payment of a designated purchase price for the water and the drink mix via a single payment transaction.

7. The vending machine of claim 1, wherein the payment interface is configured to receive payment of a designated purchase price for the water via a first payment transaction and to receive payment of a designated purchase price for the drink mix via a second separate payment transaction.

8. A water and drink mix vending machine, comprising:

a vending machine body with at least one opening configured to receive a container from a user for delivery of water into the container;

a user interface configured to receive instructions from a user to dispense an amount of water selected from a plurality of user selectable amounts of water and a user selected individually sealed drink mix package of a user selected concentration selected from a plurality of individually sealed drink mix packages of a plurality of user selectable predetermined concentrations, wherein the concentrations correspond to different amounts of water;

a processor configured to receive a signal corresponding to said instructions from said user and to associate said signal with a corresponding actuation command, the processor further configured to output said actuation command upon receipt of a signal confirming payment of a designated purchase price for the water and drink mix; and a dispenser comprising a water dispensing mechanism having a discharge nozzle that is fluidly connectable to a municipal water supply via one or more filters that filter out undesirable particles or impurities from the water, the discharge nozzle being alignable with the container and configured to dispense water into the container positioned in the opening upon receipt of payment for the water; and a drink mix dispensing mechanism comprising one or more product trays configured to support the plurality of individually sealed drink mix packages, each of the packages containing a drink mix in a predetermined amount, a drop chute extending from a proximal end to a distal end, the proximal end of the chute in communication with the one or more product trays and sized to allow the user selected drink mix package to pass therethrough, and a delivery bin that is attached to the distal end of the drop chute, the delivery bin sized to receive the user selected drink mix package and to allow a user to retrieve the user selected drink mix package, the delivery bin being separate from the opening that receives the container, wherein the drink mix dispensing mechanism is configured to dispense the user selected drink mix package separately from the water upon receipt of payment for the drink mix package, and wherein the dispenser is configured to receive said actuation command from the processor and to dispense the user selected amount of water and the user selected drink mix package, wherein the user selected drink mix package is dispensed in an unmixed state relative to the water, and wherein the user selected drink mix package has a concentration that corresponds to at most an amount of water equal to the user selected amount of water, the drink mix package being automatically dispensed upon selection by the user.

9. The vending machine of claim 8, wherein the drink mix dispensing mechanism is built into the vending machine body.

10. The vending machine of claim 8, wherein the drink mix comprises a dry mix, a gel and/or a liquid concentrate.

11. The vending machine of claim 8, wherein the drink mix comprises an isotonic sport mix, a lemonade mix, an iced tea mix, a vitamin enhanced mix and/or a fruit flavored mix.

12. The vending machine of claim 8, wherein the drink mix package is a canister, a bag, a stick, a pouch or a packet.

13. The vending machine of claim 8, wherein the drink mix package is a user resealable container.

14. The vending machine of claim 8, wherein the concentration of the drink mix is configured to match a quantity of water dispensed by the dispenser.

15. The vending machine of claim 8, further comprising a payment interface configured to receive coins, paper currency, debit cards, credit cards, and/or prepaid cards for the payment of the water or drink mix.

16. The vending machine of claim 15, wherein the payment interface is built into the vending machine body.

17. The vending machine of claim 8, further comprising a memory coupled with the processor, the memory configured to store processor instructions and/or purchase price information for the water and the drink mix.

18. A method for dispensing water and a drink mix from a vending machine, comprising:

receiving payment of a designated purchase price corresponding to a user selected quantity of water selected from a plurality of user selectable amounts of water and a user selected individually sealed drink mix package of a user selected concentration selected from a plurality of individually sealed drink mix packages of a plurality of user selectable predetermined concentrations, wherein the concentrations correspond to different amounts of water;

receiving a request from a user for the vending of said user selected quantity of water and said user selected drink mix package from the vending machine;

communicating a liquid dispensing actuation signal to a liquid dispensing system of the vending machine for dispensing said water into a container removably disposed in the vending machine, said liquid dispensing system having a discharge nozzle that is fluidly connectable to a municipal water supply via one or more filters that filter out undesirable particles or impurities from the water, the discharge nozzle being alignable with the container positioned in an opening of the vending machine and configured to dispense water into the container positioned in the opening upon receipt of payment for the water; and communicating a drink mix package dispensing actuation signal to a drink mix package dispensing system of the vending machine comprising one or more product trays configured to support the plurality of individually sealed drink mix packages, each of the individually sealed drink mix packages containing a drink mix in a predetermined amount, a drop chute extending from a proximal end to a distal end, the proximal end of the chute in communication with the one or more product trays and sized to allow the user selected drink mix package to pass therethrough, and a delivery bin that is attached to the distal end of the drop chute, the delivery bin sized to receive the user selected drink mix package and to allow a user to retrieve the user selected drink mix package, the delivery bin being separate from and in communication with the opening that receives the container, wherein the drink mix dispensing mechanism is configured to dispense the user selected drink mix package separately from the dispensed user selected amount of water upon receipt of payment for the user selected drink mix package, wherein the user selected drink mix package is dispensed in an unmixed state relative to the water, and wherein the user selected drink mix package is dispensed separate from the container, and wherein the user selected drink mix package has a concentration that corresponds to at least an amount of water equal to the user selected amount of water, the drink mix package being automatically dispensed upon selection by the user.

19. The method of claim 18, wherein dispensing said water includes dispensing a user specified amount of water.

20. The method of claim 18, wherein the water and the drink mix are dispensed separately for subsequent mixing by the user.

21. The method of claim 18, wherein the designated purchase price of the drink mix varies with a concentration of the drink mix relative to the dispensed quantity of water from the vending machine.

22. The method of claim 18, wherein the designated purchase price of the water is at least partly based on an amount of water requested by the user.

23. The method of claim 18, wherein the dispensed drink mix is selected at least partly based on an amount of water requested by the user.

24. The method of claim 18, wherein receiving payment of the designated purchase price for the water and/or drink mix comprises receiving payment via coin, paper currency, debit card, credit card, and/or prepaid card.

25. The method of claim 18, wherein payment of the designated purchase price for the water and the requested drink mix are received via a single payment transaction.

26. The method of claim 18, wherein payment of the designated purchase price for the water and the requested drink mix are received via separate payment transactions.

* * * * *

UNITED STATES PATENT AND TRADEMARK OFFICE

CERTIFICATE OF CORRECTION

PATENT NO. : 8,162,210 B2
APPLICATION NO. : 12/192788
DATED : April 24, 2012
INVENTOR(S) : Brian McInerney et al.

It is certified that error appears in the above-identified patent and that said Letters Patent is hereby corrected as shown below:

In claim 1 at column 7, line 18, please delete "individual" and insert --individually--, therefor.

Signed and Sealed this
Fourth Day of December, 2012

David J. Kappos
*Director of the United States Patent and Trademark Office*